United States Patent [19]

Dorren

[11] 3,902,131

[45] Aug. 26, 1975

[54] TANDEM AUDIO DYNAMIC RANGE EXPANDER

[75] Inventor: Louis Dorren, San Mateo, Calif.

[73] Assignee: Quadracast Systems, Inc., San Mateo, Calif.

[22] Filed: Sept. 6, 1974

[21] Appl. No.: 503,716

[52] U.S. Cl.......... 330/126; 179/100.4 ST; 330/149; 333/14

[51] Int. Cl.$^2$... H03G 7/00; H03G 7/06; H04B 1/64

[58] Field of Search .................. 333/14, 17; 323/19; 179/1 GQ, 15 AV, 100.4 ST; 330/126, 149, 151

[56] References Cited

UNITED STATES PATENTS

| | | | |
|---|---|---|---|
| 3,665,345 | 5/1972 | Dolby | 333/14 |
| 3,735,290 | 5/1973 | Yamazaki | 333/14 |
| 3,795,876 | 3/1974 | Takahashi et al. | 333/14 |
| 3,798,562 | 3/1974 | Takahashi et al. | 333/14 X |

*Primary Examiner*—Paul L. Gensler
*Attorney, Agent, or Firm*—Robert G. Slick

[57] ABSTRACT

An audio signal which has been compressed at two different frequencies for recording is expanded to its initial characteristics for reproduction by means of a tandem expander wherein the incoming signal is divided into paths representing a mid band variable gain path and a high band variable gain path and the two variable gain paths are subtracted from the main signal to provide a signal expanded in dynamic range. The control voltage for the high band variable gain path is extracted from the incoming signal. The system is particularly useful in the demodulation of discreet four-channel records.

2 Claims, 1 Drawing Figure

PATENTED AUG 26 1975 3,902,131
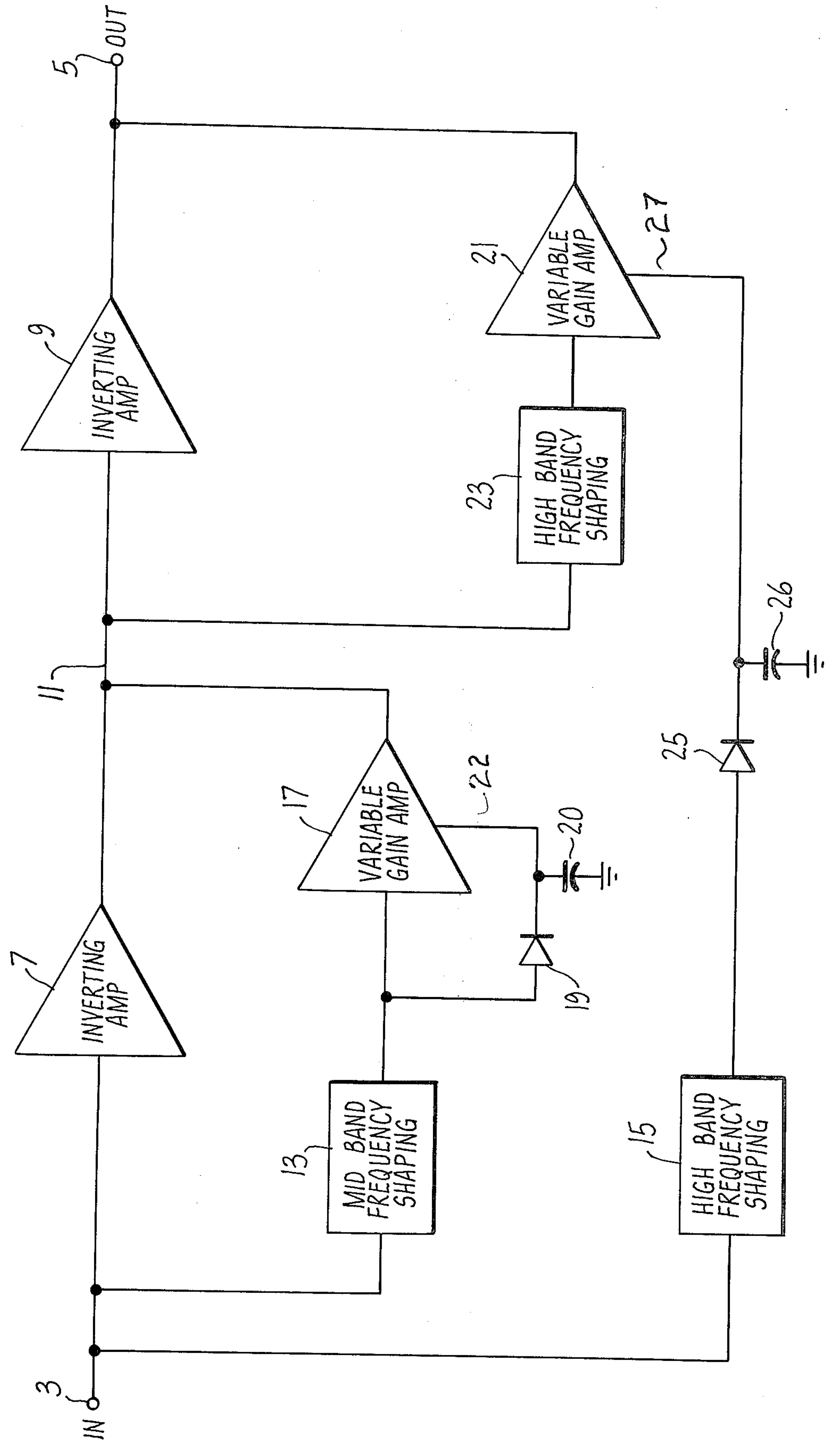

TANDEM AUDIO DYNAMIC RANGE EXPANDER

SUMMARY OF THE INVENTION

In the discreet four-channel phonograph record, four audio signals must be carried in a single groove. The left and right (front plus back) channels are carried in the usual manner for stereo records, while the back information for each channel is carried as a difference signal (i.e. front minus back) which is modulated on an FM carrier having a frequency of about 30 kHz. In order to minimize distortion and increase signal-to-noise ratio, the audio information for the difference signals is compressed in two frequency bands centered on about 630 Hz and 15 kHz. When the record is played, it is necessary to expand the dynamic range of the difference signal information so that it will have the proper amplitude relationship with the sum information before the signals are matrixed to separate the front from the back information. Thus, an expander must be employed which is the exact complement of the compressor in the recorder.

In the past, this expansion has been carried out by a parallel system wherein the audio signal is passed through parallel frequency sensitive networks and variable gain amplifiers and then combined additively to produce the expanded audio difference signal for matrixing with the sum information. The difficulty with such a system is that phase distortion is frequently introduced into the system and it is obvious that if the audio signals containing the front minus back information are not in proper phase relationship with the front plus back signals, they cannot be properly matrixed to provide the separation of the front and back information.

In accordance with the present invention, a tandem system is provided wherein the phase relationship of the expanded difference signal will be exactly that of the incoming signal so that it can be properly matrixed with the sum signal. This is accomplished by the use of a subtraction method rather than the parallel addition method of the prior art.

Further in accordance with the present invention, an expander circuit is provided wherein the inputs to the controls for the variable gain circuits are in parallel, thus obviating any phasing problem, while the outputs are subtractively applied in tandem to the signal.

An important aspect of the invention is the voltage for controlling the high band variable gain is taken directly from the incoming, unprocessed signal.

Thus, in accordance with the present invention, a two band expander is provided which does away with the usual design considerations with respect to phase relationships, has a low distortion, a good tracking capability in the playback curve and one which is simple to implement in hardware since it requires relatively few and inexpensive components.

Various other features and advantages of the invention will be brought out in the balance of the specification.

BRIEF DESCRIPTION OF THE DRAWING

The sole FIGURE of the drawing is a schemmatic diagram of an expander embodying the present invention.

DESCRIPTION OF THE PREFERRED EMBODIMENTS

Referring now to the drawing by reference characters, there is shown an expander having an audio input line 3 and an audio output line 5. Inserted in this line is a first isolation inverting amplifier 7 and a second isolation inverting amplifier 9 in series with each other. Both amplifiers have unity gain over a broad frequency range and invert a signal 180°. Thus, an audio signal which enters input 3 will pass through the first amplifier 7 and the output at a point 11 will be 180° out of phase with the input. This signal is now passed through the second inverting amplifier 9 where it is again inverted at 180° so that the output at point 5 is back in phase with the input at point 3 and the amplitude is unchanged. The input signal through the line 3 is also fed to two frequency selective networks designated 13 and 15. In the present embodiment of the invention, network 13 has a center frequency of 630 Hz and the 3db down bandwidths is from about 510 to 750 Hz. Network 15 has a midpoint of about 15 kHz and a 3db down bandwidth of from about 7.5 to 22 kHz. Obviously these particular frequencies and bandwidths were selected to meet the specific compression of the particular recorder and are only illustrative of the present invention.

The output from the network 13 is fed to a variable gain amplifier 17 and also to a rectifier 19 having a filtering capacitor 20 in its output. The output taken through line 22 is a DC control voltage. The characteristics of variable gain amplifier 17 are such that when a low control voltage is fed to the amplifier through the line 22, the gain of the amplifier will be high while if a high DC voltage is fed through line 22, the gain of amplifier 17 will be low. Thus, at a high level signal from the mid band frequency shaping network 13, the rectifier 19 has maximum DC output and the variable gain amplifier 17 will have minimum output. The outputs from amplifiers 7 and 17 are 180° out of phase and therefore subtracting at point 11. Now if the signal level at the mid band frequency of network 13 is high, the voltage output from the rectifier 19 will be high while the output from the amplifier 17 will be low. Since we have little or no output from amplifier 17 and it is subtracting from the input to the output of the amplifier 7, the overall gain at this particular frequency will be almost unchanged. Conversely, if the signal input is low, the control voltage will be low, causing the output of amplifier 17 to be high and when this output is subtracted from the output of amplifier 7 the net result is a decrease in amplitude at point 11, i.e. an increase in dynamic range. The slope of the variable gain increases as a complement to the compressor in the recording device.

Two high band frequency shaping networks, namely 15 and 23, are employed, both of which have the same characteristics. The input signal from line 3 is fed to network 15 and the output is rectified in rectifier 25 and filtered through capacitor 26 to give a DC control voltage through line 27. This control voltage is derived from point 3 rather than point 11 to prevent interaction with the control of the mid band section and this is an important aspect of the invention. Network 23 is fed from line 11 and it will be remembered that this input is inverted from the input at 3. Variable gain amplifier 21 has the same characteristics as were described in connection with amplifier 17 so that when the input from line 27 is at maximum, the gain of amplifier 21 is at its lowest so that it will have substantially no effect on the output signal at 5. On the other hand, when the output from the network 15 is low, the control voltage fed to the amplifier 21 will be low and therefore the output from amplifier 21 will be high. Since the amplifier 9 has inverted the signal, the outputs from amplifier 9 and 21 are subtracting and, therefore, the high band signal output at 5 will be increased in dynamic range.

As a result, the signal which was compressed in dynamic range during recording is now restored to its original dynamic range for reproduction.

Although a specific embodiment of the invention has been described, it will be realized that this is merely for purposes of illustration and the invention is one of broad applicability.

I claim:

1. An audio expander for increasing the dynamic range of an audio signal, which has been compressed in amplitude at a high band frequency and at a mid band frequency, to restore the signal to its original dynamic range, comprising in combination:

a. means for receiving an incoming audio signal and dividing said signal into three paths, b. passing a first path signal through a first inverting amplifier to produce an output signal having substantially the same amplitude as the incoming signal and inverted 180°, c. passing a second path signal through mid band frequency shaping means, said means having an output representing the unattenuated mid band frequency wherein higher and lower frequencies are attenuated, d. passing a portion of the output of said mid band means through a rectifier to obtain a DC control voltage, e. passing another portion of the output of said mid band means through a first variable gain amplifier wherein the variable gain of said amplifier is determined by said DC control voltage, the gain of said amplifier being inversely proportional to the control voltage, f. combining the output of said first variable gain amplifier with said inverted output of first inverting amplifier whereby the outputs of the two amplifiers subtract, g. passing the thus produced combined signal to a second inverting amplifier wherein said amplifier has an output 180° out of phase with its input and in phase with the initial signal, h. passing a third path input signal through a high band frequency shaping means and a rectifier to derive a second control voltage, i. passing a portion of the signal representing the output of the first inverting amplifier and the first variable gain amplifier to a second high band frequency shaping means, said means having an output representing the unattenuated high band frequency wherein higher and lower frequencies are attenuated, j. passing said output from said second high band frequency shaping means to the input of a second variable gain amplifier, k. passing said second control voltage to said second variable gain amplifier, and l. adding the output of the second inverting amplifier to the output of the second variable gain amplifier to derive an audio signal exxpanded in dynamic range.

2. The structure of claim 1 wherein the mid band frequency shaping means is centered at 630 Hz and the high band shaping means is centered on 15 kHz.

* * * * *